US007014453B2

(12) United States Patent
Moran et al.

(10) Patent No.: US 7,014,453 B2
(45) Date of Patent: Mar. 21, 2006

(54) MACHINE HAVING SENSORS FOR CONTROLLING MOLDING OPERATION

(75) Inventors: Michael W. Moran, Highland, MI (US); Michael P. Schoemann, Waterford, MI (US); Les A. Gilewski, Fair Haven, MI (US); William L. Manto, Washington Township, MI (US); John L. Fox, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 186 days.

(21) Appl. No.: 10/322,029

(22) Filed: Dec. 17, 2002

(65) Prior Publication Data

US 2004/0115294 A1 Jun. 17, 2004

(51) Int. Cl.
B29C 49/20 (2006.01)
B29C 49/48 (2006.01)
B29C 49/78 (2006.01)

(52) U.S. Cl. ............... 425/503; 425/136; 425/170; 425/522

(58) Field of Classification Search ............... 425/136, 425/522, 170, 503, 149; 264/516
See application file for complete search history.

(56) References Cited

U.S. PATENT DOCUMENTS

| 3,575,949 | A | * | 4/1971 | Humphrey ............... 264/516 |
| 3,677,680 | A | * | 7/1972 | Etherington ............. 425/129.1 |
| 3,834,848 | A |   | 9/1974 | Farrell |
| 4,104,343 | A | * | 8/1978 | Cornelius ............... 264/40.1 |
| 4,200,428 | A |   | 4/1980 | Andrews |
| 4,532,093 | A |   | 7/1985 | O'Malley et al. |
| 4,574,474 | A | * | 3/1986 | Langham ............... 29/858 |
| 5,091,124 | A |   | 2/1992 | Zakich |
| 5,100,204 | A | * | 3/1992 | Makihara et al. ...... 297/452.65 |
| 5,338,503 | A | * | 8/1994 | Yanagisawa et al. ....... 264/516 |
| 5,470,218 | A | * | 11/1995 | Hillman et al. ........... 425/144 |
| 5,851,456 | A | * | 12/1998 | Mukawa et al. ........... 264/40.1 |
| 5,876,766 | A |   | 3/1999 | Chou |
| 5,902,527 | A | * | 5/1999 | Flood ............... 264/40.3 |
| 6,062,843 | A |   | 5/2000 | Yamaura |
| 6,074,584 | A |   | 6/2000 | Hinzpeter et al. |
| 6,186,760 | B1 | * | 2/2001 | Latham ............... 425/149 |
| 6,529,796 | B1 | * | 3/2003 | Kroeger et al. ........... 700/202 |

FOREIGN PATENT DOCUMENTS

DE 692 13 307 T2 11/1992
DE 198 34 797 A1 2/2000

(Continued)

OTHER PUBLICATIONS

Gunther Menning, Mold-Making Handbook, 2nd Edition, Hanser/Gardner Publications, Inc., 1998, pp. 518-519.*
Partial machine translation of JP 11-207750 A obtained from the JPO website.*

(Continued)

Primary Examiner—Robert B. Davis
(74) Attorney, Agent, or Firm—Brooks Kushman P.C.

(57) ABSTRACT

A mold and molding machine having a sensor and a control circuit for monitoring operation of the molding machine during a molding operation. The molding machine may be a blow molding machine that is used in an insert molding operation wherein a preformed insert is placed in the mold and the sensor is used to detect the condition within the mold such as the location of the insert. The insert sensor may be a microswitch, proximity sensor, or ultrasonic sensor. Other sensors such as temperature sensors or pressure sensors may also be incorporated in the mold.

16 Claims, 2 Drawing Sheets

FOREIGN PATENT DOCUMENTS

| | | | |
|---|---|---|---|
| DE | 202 16 709 | U1 | 7/2003 |
| EP | 1 000 727 | A1 | 5/2000 |
| JP | 60219017 | A * | 11/1985 |
| JP | 04110131 | A * | 4/1992 |
| JP | 11207750 | A * | 8/1999 |
| WO | WO 02/47884 | A1 | 6/2002 |

OTHER PUBLICATIONS

Dal Kashal, Manufacturing Engineer's Reference Book, Butterworth-Heinemann Ltd., 1993, section 12.7.1.1.*

McMillan et al, Process/Industrial Instruments and Controls Handbook, McGraw-Hill, 5th edition, 1999, pp. 5.74-5.77.*

* cited by examiner

MACHINE HAVING SENSORS FOR CONTROLLING MOLDING OPERATION

BACKGROUND OF THE INVENTION

1. Field of the Invention

The present invention relates to molds used for forming parts that include sensors that are used in controlling the operation of a molding machine.

2. Background Art

Thermoplastic part molds are generally constructed from steel or aluminum castings or billets that are specially adapted for a process used to mold the part. Internal monitors, sensors, and other control devices are not generally used in thermoplastic molding operations.

Molding machines such as injection molding machines, blow molding machines and the like may include various sensors for controlling machine operation. For example, U.S. Pat. No. 6,062,843 discloses a safety circuit for injection molding machine that stops operation of a servo motor driving an injection pin when a safety door is open. U.S. Pat. No. 5,091,124 discloses a high pressure reaction injection molding press that includes a sensor for detecting relative movement opposite ends of two platens. U.S. Pat. No. 4,532,093 discloses a method of manufacturing molded packing material that has a microprocessor for controlling the system in response to sensor inputs and actuators associated with the system.

There is a need for a molding machine or a mold for a molding machine that includes sensors internal to the mold for determining a variety of conditions. More specifically, there is a need for a mold having micro switches for detection and location of an insert that is to be molded into a molded part.

These and other problems are addressed by applicants' invention as summarized below.

SUMMARY OF THE INVENTION

According to one aspect of the present invention, a mold and molding machine for molding polymeric compositions are provided as a combination. The mold is disposed in the molding machine that opens and closes the mold and controls the molding operation. The mold defines a cavity and a sensor is installed in the cavity. A control circuit monitors the sensor and is incorporated in the circuit that operates the molding machine. The sensor is operatively connected to the control circuit to prevent operation of the molding machine when the sensor indicates that the condition monitored by the sensor is not acceptable for continuing operation of the molding machine.

According to other aspects of the invention, the molding machine may be a blow molding machine in which an insert comprising an elongated metal bar is insert molded into the part. The sensor monitors the location of the bar prior to and during the molding operation. The insert may be an elongated extrusion that is secured at both ends of the mold. The sensor may be a microswitch, a proximity sensor, or an ultrasonic proximity sensor. The sensor may be shielded by the insert during the molding process.

The control circuit may be associated with the molding machine and may be connected to the mold when the mold is installed in the molding machine. Alternatively, the control circuit may be associated with the mold. The control circuit would, in this case, be installed and uninstalled relative to the molding machine with the mold.

The molding machine may be a blow molding machine and the control circuit may be associated with the mold to be installed and uninstalled relative to the molding machine with the mold. The sensor may be a pressure transducer adapted to sense the surface of the pressure of a blow molded part as it is formed.

The molding machine may further comprise a clamp for holding the insert in place that has cylinder including a sensor comprising a limit switch that is actuated when the cylinder is in a first sensed position.

According to yet another aspect of the invention, a molding machine for molding a polymeric composition onto an insert is provided. The molding machine comprises a mold disposed in the molding machine that defines a cavity. Locating elements with sensors are provided for sensing the location of the insert in a portion of the cavity. The sensors are installed in the mold and monitor the position of the insert relative to the mold. The sensors indicate whether the insert is in an acceptable position or in an unacceptable position. A control circuit is provided for controlling the operation of the molding machine wherein the sensors are operatively connected to the control circuit and prevent operation of the molding machine when the sensors indicate that the insert is in an unacceptable position.

These and other aspects of the present invention will be better understood in view of the attached drawings and the following detailed description of the invention.

DETAILED DESCRIPTION OF THE PREFERRED EMBODIMENT(S)

Figure 1:
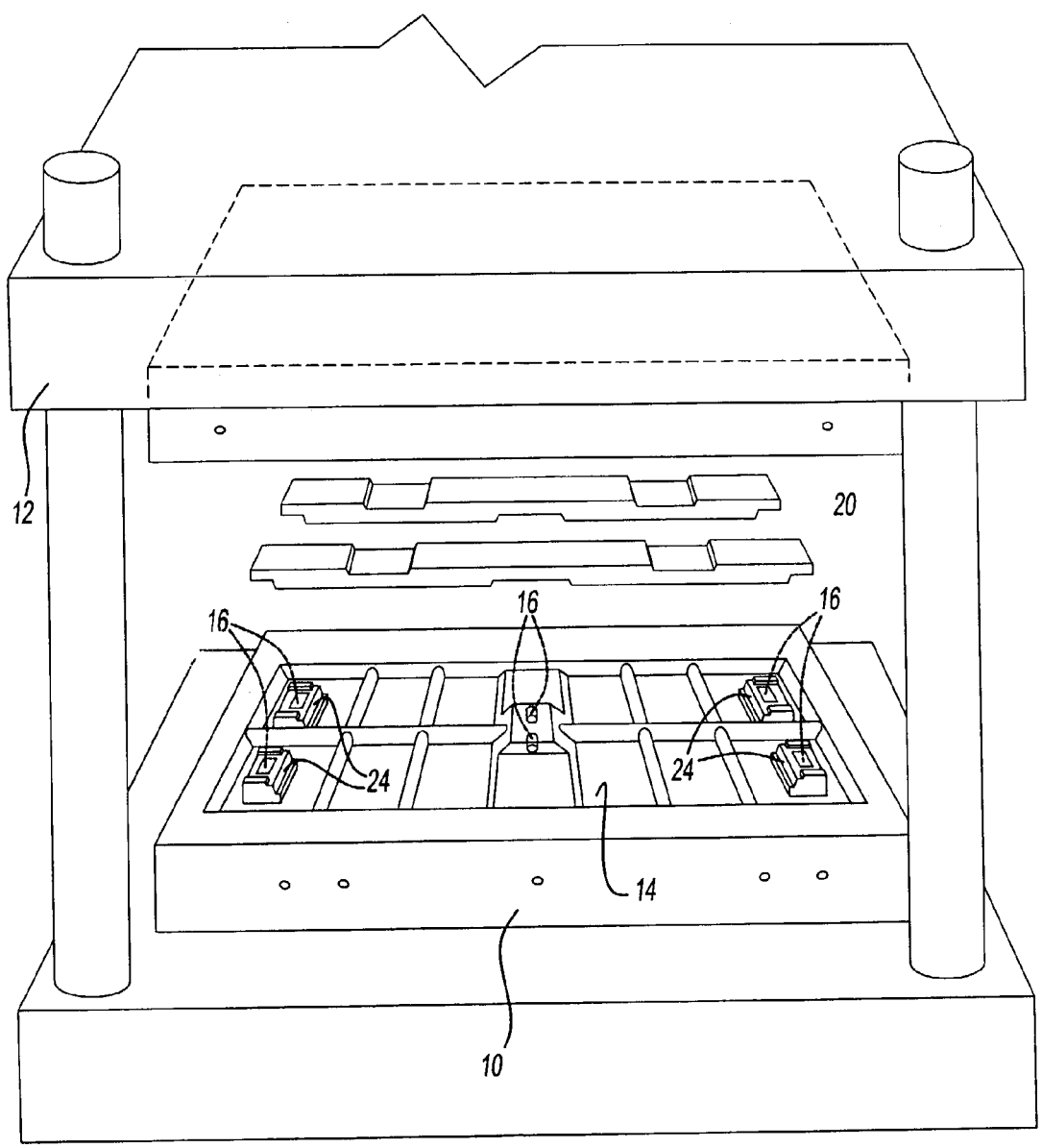
FIG. 1 is a schematic perspective view of a molding machine and mold made according to the present invention.

Referring now to FIG. 1, a mold 10 is shown installed in a molding machine 12. The mold 10 includes a cavity 14 that is used for molding polymeric material.

Sensors 16 are provided in the mold 10 for sensing various conditions in the mold. The sensors may be temperature sensors such as thermocouples or pressure sensors such as pressure transducers that are at least partially disposed within the mold cavity 14. In one embodiment of the invention, the sensors 16 may be proximity sensors. Examples of appropriate proximity sensors may include microswitches, ultrasonic proximity sensors, or density sensors.

Figure 2:
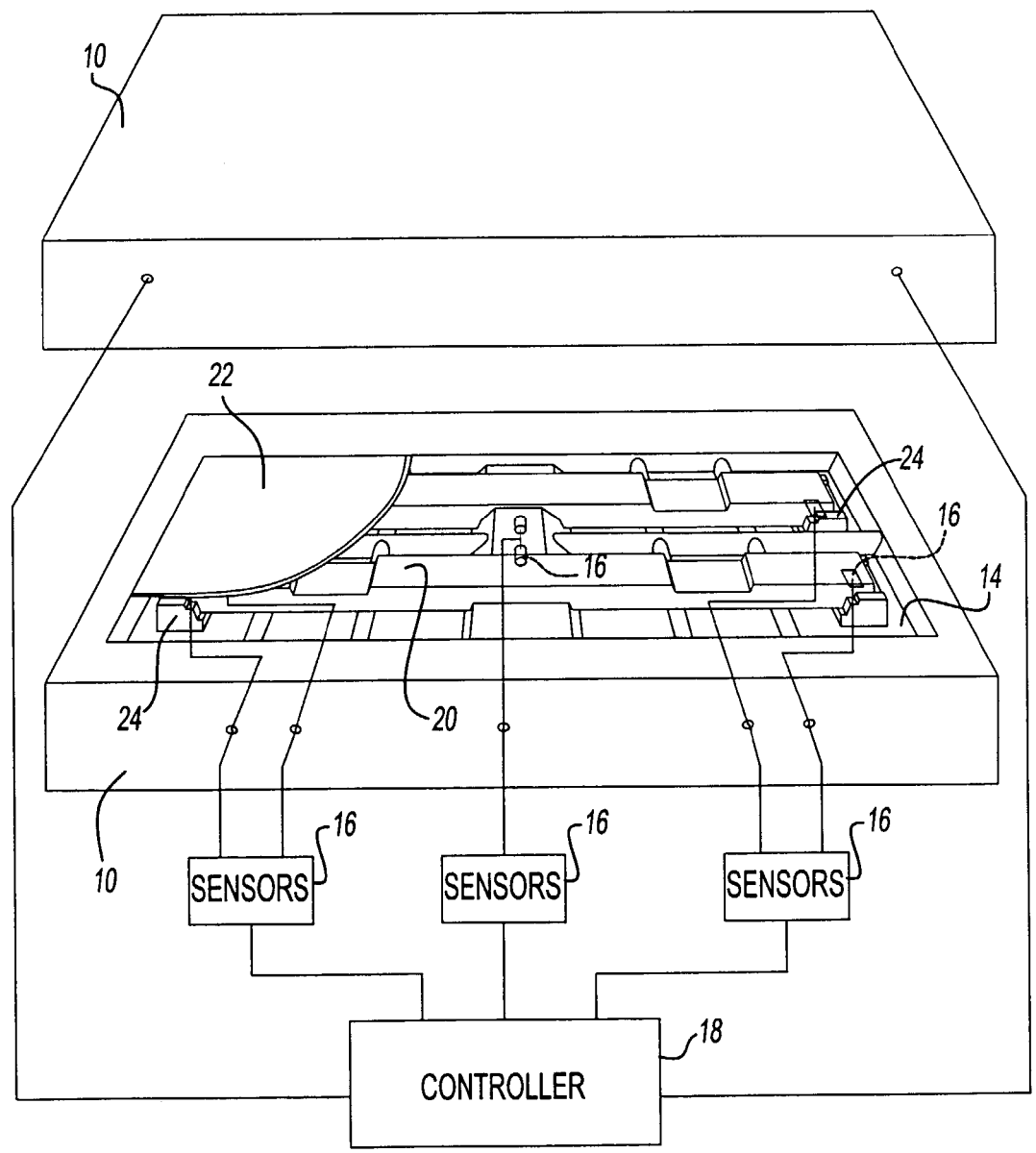
FIG. 2 is a schematic view of a mold having sensors and a controller associated with the mold in accordance with one embodiment of the present invention.

Referring now to FIG. 2, the mold 10 is shown that includes a cavity 14 in which sensors 16 are disposed. The sensors include portions that are mounted within the cavity and may also include sensor circuitry that is shown diagrammatically outside of the cavity 14. The sensors 16 are connected to a controller or control circuit 18 that is interfaced with the molding machine 12. The controller 18 may alternatively be incorporated into the controls for the molding machine 12 or may be associated with the mold 10, as illustrated.

According to one embodiment of the invention, inserts 20 are placed in the mold that are to be molded into a part 22. The inserts 20 are received on locating elements 24 within the mold cavity 14. The locating elements 24 preferably include proximity sensors 16 that sense the presence of the inserts 20 prior to the beginning and during the molding operation wherein the part 22 is formed about the inserts 20. The inserts 20 preferably are received in the locating elements 24 in such a way that they shield their associated proximity sensors 16 from the polymeric material used to form the part 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A mold and a molding machine for molding a polymeric composition in combination, comprising:
    a mold disposed in the molding machine defining a cavity;
    an insert received on locating elements that are disposed within the cavity;
    a proximity sensor installed on the locating elements in the cavity, wherein the proximity sensor is an ultrasonic proximity sensor that senses the density of the insert; and
    a control circuit for monitoring the sensor and controlling the operation of the molding machine, wherein the sensor is operatively connected to the control circuit to prevent operation of the molding machine when the sensor indicates that the insert is not in an acceptable position prior to ordering operation of the molding machine.

2. The mold and molding machine of claim 1 wherein the mold is a blow molding machine and wherein an insert comprising an elongated metal bar is insert molded into a part and the sensor monitors the location of the bar prior to and during the molding of the polymeric composition.

3. The mold and molding machine of claim 1 wherein the insert is an elongated extrusion secured at both ends within the mold.

4. The mold and molding machine of claim 1 wherein the control circuit is associated with the molding machine and is connected to the mold when the mold is installed in the molding machine.

5. The mold and molding machine of claim 1 wherein the control circuit is associated with the mold and is installed and uninstalled relative to the molding machine with the mold.

6. The mold and molding machine of claim 1 further comprising a temperature sensor for sensing the temperature of the mold.

7. The mold and molding machine of claim 1 wherein the molding machine is a blow molding machine, the control circuit is associated with the mold and is installed and uninstalled relative to the molding machine with the mold, and a pressure transducer installed in the cavity that is adapted to sense the surface pressure of a blow molded part as it is formed.

8. A molding machine for molding a polymeric composition onto at least one insert, comprising:
    a mold disposed in the molding machine and defining a cavity;
    locating elements for locating the insert in a portion of the cavity;
    a sensor installed on the locating elements in the mold that monitors the position of the insert relative to the mold and senses the density of the insert to determine if the insert is in an acceptable position, the sensor indicating whether the insert is in the acceptable position or in an unacceptable position;
    a control circuit for controlling the operation of the molding machine, wherein the sensor is operatively connected to the control circuit to prevent operation of the molding machine when the sensor indicates that the insert is in the unacceptable position.

9. The molding machine of claim 8 wherein the mold is a blow molding machine and wherein the insert is an elongated metal bar that is insert molded into a part.

10. The molding machine of claim 8 wherein the insert is an elongated extrusion secured at both ends within the mold.

11. The molding machine of claim 8 wherein the control circuit is associated with the mold and is installed and uninstalled relative to the molding machine with the mold.

12. The molding machine of claim 8 wherein the control circuit is associated with the molding machine and is connected to the mold when the mold is installed in the molding machine.

13. The molding machine of claim 8 further comprising a micro-switch installed in the cavity that is shielded by the insert during the molding process.

14. The molding machine of claim 8 wherein the sensor is a proximity sensor.

15. The molding machine of claim 8 further comprising a temperature sensor for sensing the temperature of the mold.

16. A mold and a molding machine for molding a polymeric composition in combination, comprising:
    a mold disposed in the molding machine defining a cavity;
    an insert that is placed on a locating element within the mold cavity;
    a sensor installed on the locating element in the cavity, wherein the sensor is a micro-switch that is shielded by the insert during the molding process when the insert is properly positioned on the locating element; and
    a control circuit for monitoring the sensor and controlling the operation of the molding machine, wherein the sensor is operatively connected to the control circuit to prevent operation of the molding machine when the sensor indicates that the insert is not properly positioned on the locating element.

* * * * *